United States Patent [19]

Pardue, Jr. et al.

[11] 4,280,768
[45] Jul. 28, 1981

[54] ANCHOR DRIVE COUPLER

[75] Inventors: James I. Pardue, Jr., Birmingham; William M. Hornsby, Hueytown; Henry J. Noble, III, Birmingham, all of Ala.

[73] Assignee: Dixie Electrical Manufacturing Company, Memphis, Tenn.

[21] Appl. No.: 105,593

[22] Filed: Dec. 20, 1979

[51] Int. Cl.³ .............................................. F16D 1/00
[52] U.S. Cl. ....................................... 403/3; 403/337; 52/157
[58] Field of Search .................... 403/337, 335, 287, 3, 403/4, 336, 338; 52/157, 165; 64/1 R, 1 C, 1 S

[56] References Cited

U.S. PATENT DOCUMENTS

| | | | |
|---|---|---|---|
| 816,631 | 4/1906 | Widmer | 52/157 |
| 2,830,801 | 4/1958 | Stratienko et al. | 403/337 X |
| 3,645,055 | 2/1972 | Roza | 52/157 |
| 3,662,436 | 5/1972 | Roza | 52/157 X |
| 3,793,786 | 2/1974 | Jahnke | 52/157 |
| 3,828,562 | 8/1974 | Petres | 405/259 |
| 3,832,860 | 9/1974 | Jahnke | 405/259 |
| 3,832,861 | 9/1974 | Jahnke et al. | 405/259 X |

Primary Examiner—Andrew V. Kundrat
Attorney, Agent, or Firm—Paul M. Denk

[57] ABSTRACT

An anchor drive coupler for use in interconnecting an earth anchor with the drive mechanism used for embedding the anchor deeply into the ground, the coupler includes a sleeve, having upper and lower closure plates rigidly secured therewith, and an adapter connects with the upper plate for securement of the coupler with the drive mechanism, while the upper portion of the earth anchor is pinned to the said sleeve or a lower adapter secured therewith, for furnishing interconnection between the drive mechanism and the earth anchor so that driving torque will be transmitted for effecting a deep penetration of the anchor into the ground during its installation.

5 Claims, 4 Drawing Figures

ANCHOR DRIVE COUPLER

CROSS REFERENCE TO RELATED APPLICATION

The subject matter of this application is related to and comprises a continuation-in-part of the application of James I. Pardue, Jr., William M. Hornsby, and Henry J. Noble III, upon the invention pertaining to earth anchor, as filed in the U.S. Patent Office on Oct. 30, 1979, under Ser. No. 089,446.

BACKGROUND OF THE INVENTION

This invention relates generally to couplers, and more specifically pertains to a universal form of coupling for connection of the variety of earth anchors to the driving tool used during embedment of the anchor deeply into the ground.

A great variety of earth anchors, and various types of driving tools, are readily available in the art, and most of these combinations have some form of means for joining the driving tool with the earth anchor to be driven into the soil. And, since significant pressures, up to as much as eight thousand or more, of foot-pounds of torque may be required for driving the anchor into the soil, the strength of the coupler must emulate the strength of the driving tool and anchor to be driven. And, in certain instances, the adapter utilized for joining these components together has been designed rather complexly, incorporating various shear means for the purpose of limiting the amount of pressure that can be exerted through to the anchor, as by the driving means, so as to apparently prevent the exertion of excessive force upon the anchor, and which could cause its fracture. This can be seen in the U.S. Pat. Nos. 3,832,860 to Jahnke and 3,832,861.

Various other styles of earth anchor extensions are shown in the prior art, and for use in connecting end portions of the anchor shaft with the extension rods, and such is shown in the U.S. Pat. No. 3,662,436 to Roza. Other means for joining the drive shank with its anchor and which includes the process of threading or fastening the same together are shown in the additional U.S. Pat. No. 3,793,786 to Jahnke, and also in the other U.S. Pat. No. 3,645,055 to Roza.

The patent to Petres, U.S. Pat. No. 3,828,562, discloses another related method for connecting its anchor with the power tool, in a manner similar to the earlier identified Jahnke patents. The patent to Widmer U.S. Pat. No. 816,631, discloses a means for coupling the hand operated driving means with the earth anchor to be driven into the ground.

The current invention, on the other hand, exhibits as its principal object the use of a coupler that is easily installable and can universally accept connection with any of the variety of tube means or extensions that extend integrally upwardly from the earth anchor, so as to furnish within one coupler the means for driving connection with any of the variety of earth anchors currently available upon the market.

Another object of this invention is to provide a coupler that can readily secure with the Kelly bar adapter normally depending from the driving instrument used for the embedment of an earth anchor.

Another object of this invention is to provide a means for quickly securing through the use of a pinned connection through a coupler of the drive means to an installable anchor.

Another object of this invention is to provide a coupler that may be permanently secured onto the drive shaft of the power means used for driving earth anchors into the ground, and always be readily available for prompt installation of the earth anchor to facilitate and expedite the drive of such into the ground.

These and other objects will become more apparent to those skilled in the art upon reviewing the summary of this invention, and upon undertaking a description of its preferred embodiment in view of the drawing.

SUMMARY OF THE INVENTION

This invention contemplates the formation of a coupler that may be temporarily or permanently installed to the Kelly bar adapter extending from a drive means or power tool used for embedding a foundation, earth, or guy anchor into the soil. More specifically, the coupler may be used as the means for securing with the variety of extension rods, tubular shafts, or other means forming the shank portion of the earth anchor as revealed in our prior U.S. patent application identified in the herein cross reference section, indicating that this coupler is rather universal in design, capable of being able to accommodate the prompt fastening therewith, for immediate drive, of a variety of styles of earth anchors of our Company's design, and for that matter, the variety of earth anchors readily available upon the market.

More specifically, the coupler of this invention incorporates a sleeve having integral upper and lower closure plates, including means for fastening of the Kelly bar to the upper plate, with a related type of adapter, of slightly differing design, extending downwardly from the lower closure plate have apertures therethrough, and are designed for aligning with related type apertures formed in the upper part of the earth anchor, so that when the earth anchor is slid into position upon this coupler for connection with the driving means, a pin or other form of connection may be promptly slid through the same, thereby providing a joining that forms a highly strengthened interconnection between the anchor and the drive means through the use of the coupler of this design. In addition, an anchor drive section is disposed for connection with the tubular means extending downwardly from the lower adapter, with said drive section having upper and lower extending tubing for likewise connection with said adapter, and thereby with the coupler, while the lower extending rod or tube is designed for slidingly fitting within the upper reaches of the narrower shank portion for an earth anchor, and in this manner, the drive section acts as a reduction adapter for providing for securement with the drive means of the smaller gauge type of earth anchor.

BRIEF DESCRIPTION OF THE DRAWING

In the drawing, FIG. 1 provides a partial sectional and exploded view of the comprehensive earth anchor coupler of this invention.

DESCRIPTION OF THE PREFERRED EMBODIMENT

Figure 1:
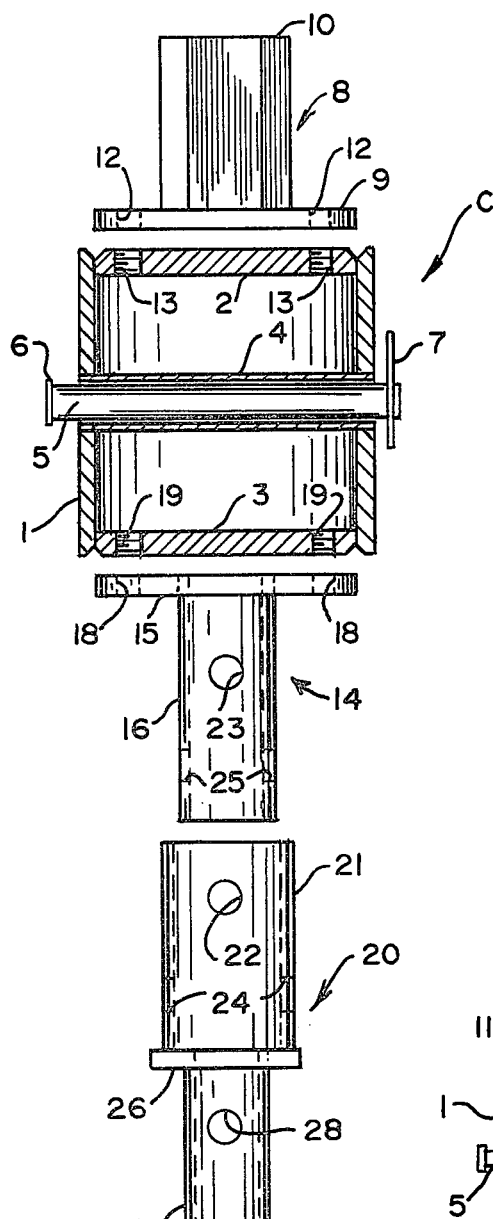
Figure 4:
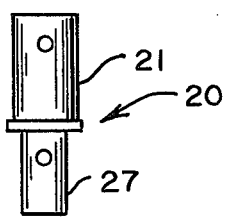
FIG. 4 discloses the coupler of FIG. 1, in its assembled state, with the anchor drive section slightly displaced therebelow, but arranged in alignment, in preparation for its attachment therewith.

By referring to FIGS. 1 and 4 of the drawings, the basic coupler of this invention is disclosed, as at C, and comprises a length of sleeve like member 1 having upper and lower closure plates 2 and 3, respectively, with these closure plates being integrally secured, as by welding, or other means of fastening, with the upper and lower ends of said sleeve. Provided through the center of the sleeve is a tubular guide 4, having openings provided laterally diametrically of the sleeve 1, and through the tubular guide a pin 5 may insert, approximately up to its head 6, with an implement key 7 capable of being inserted through the opposite end of the pin for securing it in position. The usage of this particular pin 5 for holding the upper end of a earth anchor to the coupler will be subsequently described.

Disposed for securement upon the upper end or upon the closure plate 2 is a type of Kelly bar adapter 8, having a plate 9 integrally formed on the lower end of its length of shaft 10, and which shaft usually incorporates a cross section shape, such as that of a cross, that can be accommodated within the chuck of a drive means, such as the type of power drive means normally used for the hand held tool that may be employed for driving an earth anchor into the ground, or within the power means normally provided upon a vehicle or truck and which is used for driving the higher strength accommodating anchors as used in the art. Fasteners 11 may bolt through the apertures 12 for threading within the openings 13 formed within the upper closure plate 2, for securement of the adapter 8 with the coupler C.

A lower adapter 14 likewise incorporates a plate means 15 having a downwardly extending tube means 16, and this lower adapter plate 3 in the manner as shown in FIG. 4. As disclosed, a plurality of fasteners 17 insert through the apertures 18 of the plate 15, and are threaded into the openings 19 formed into said closure plate 3. When secured together in this manner, i.e., with the upper and lower adapters 8 and 14, respectively, originally secured with the connecter C, said connector is readied for facile usage for attachment therewith of the upper end of any of the variety of earth anchors that may be accommodated by such a tool, and promptly driven into the ground for functioning as a foundation anchor, earth anchor, or guy anchor, as are used in the trade.

Disposed for securement onto the lower adapter 14 is an anchor drive section 20 and it incorporates an upper tubular-like portion 21 designed for telescopically fitting onto the tube means 16, and it incorporates aligned apertures 22 that may be lined up with the apertures 23 of the tube means 16, so that a pin (not shown) may be inserted therethrough for securing these components together. Likewise, an additional set of aligned apertures 24 may be lined up with similar apertures 25 formed through the tube-like means 16, and they accommodate another pin (not shown) for providing securement of these two components together. The anchor drive section, or more specifically its upper tubelike member 26, and extending integrally downwardly therefrom is another tube-like member 27 that is useful for accommodating the guy wire type earth anchor frequently used in the utility field. In addition, aligned apertures 28 are formed through this tube member 27, and are available for accommodating a related pin (not shown) for prompt securement of the guy anchor with the coupler, and hence, with the drive means employed.

Figure 2:
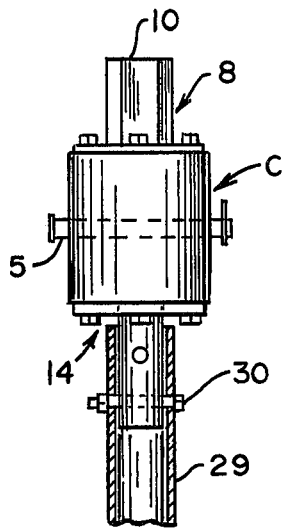
FIG. 2 discloses a side view, partially in section, of the coupler of this invention having the upper part of an anchor shank connecting onto its lower extending adapter.

As can be seen in FIG. 2, the coupler C, or more specifically its lower adapter 14, can be used for direct connection with the upper shank portion 29 of an earth anchor, wherein further downwardly along the said shank portion one or more helical blades (not shown) will integrally secure with said portion 29. And, a pin 30 can be quickly inserted through the aligned apertures formed within the adapter 14, such apertures as also shown at 25 within FIG. 1, so as to provide a prompt means for securement of the anchor through the coupler and with the drive means that creates the necessary foot-pounds of torque that are necessary for driving the anchor deeply into the ground.

Figure 3:
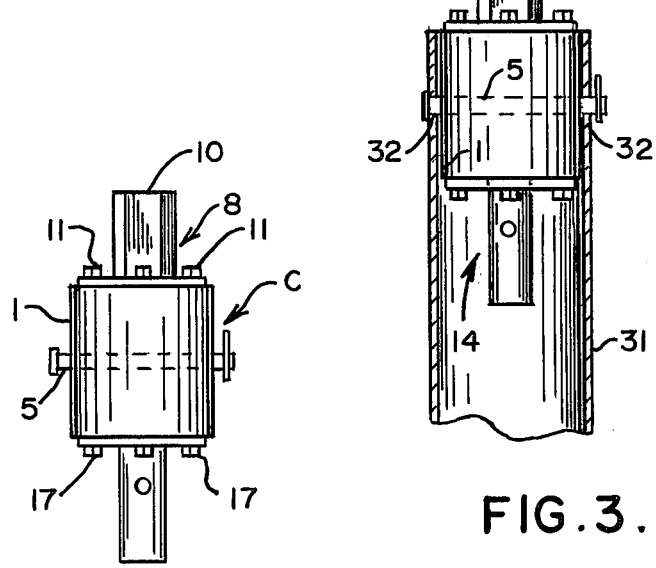
FIG. 3 discloses the coupler securing with the larger diametered form of shaft portion of an earth anchor.

An alternative form of connection of an anchor, such as the upper part 31 of a foundation anchor, is shown in FIG. 3. In this arrangement, the lower adapter 14 is not utilized, but rather, since the foundation anchor is normally of a wider diameter, and in many instances designed for accommodating an end cap, or the like, as previously described in our earlier application, the sleeve member 1 of the coupler is designed having an external diameter that is slightly less than the internal diameter, and in many instances designed for accommodating an end cap, or the like, as previously described in our earlier application, the sleeve member 1 of the coupler is designed having an external diameter that is slightly less than the internal diameter of such a foundation anchor. Hence, tubular like upper part of the anchor 31 is designed for sliding over the coupler C, and more specifically its length of sleeve 1, until the opening through the tube guide 4 becomes aligned with the apertures 32, so that a pin, similar to the previously defined pin 5, can be slid through the aligned openings and rigidly secure the coupler with the upper end of the said foundation anchor. Thus, the coupler of this invention has been designed with flexibility of use in mind, so that the variety of styles and sizes of earth anchors, foundation anchors, and guy anchors available upon the market, as previously described, can be readily connected with a drive means, through the agency of the coupler of this invention.

Numerous variations and modifications in the construction of the anchor drive coupler of this invention may occur to those skilled in the art upon reviewing the description herein. Such variations or modifications, as encompassed by the spirit of this invention, are intended to be covered by the scope of any claims to patent protection issuing hereon. The description of the preferred embodiment, as set forth, is intended solely for illustrative purposes only, to provide a description of one embodiment of how the teachings of this invention may be utilized.

Having thus described the invention, what is claimed and desired to be secured by Letters Patent is:

1. In an anchor drive coupler for use in connecting a drive means with an earth anchor in preparation for and use in embedding the anchor into the ground, comprising, a length of sleeve means, said sleeve means having upper and lower closure plates, fastener means provided upon the upper closure plate for attachment with the drive means, an upper adapter, said adapter incorporating a length of shaft having a plate integral of its lower end, and said adapter and its plate means secured by said fasteners to the upper closure plate of the coupler, means connectible with the lower closure means for fastening the coupler with the earth anchor, said means connectible with the lower closure plate including a lower adapter, said adapter incorporating a length of tubing having a plate integrally secured with its upper end, said adapter and its plate being secured by fasteners to the lower closure plate of the coupler, an anchor drive section, said section designed for fitting onto the lower adapter tubing, said section also designed for connecting with the earth anchor, there being aligned apertures provided through said anchor drive section and the tubing of the lower adapter, and a pin insertable through said apertures for interlocking said components together.

2. The invention of claim 1 and including there being aligned apertures provided through the upper part of the earth anchor and also through the tubing of the lower adapter, and a pin insertable through said apertures for interlocking said components together.

3. The invention of claim 1 and including there being aligned apertures provided through the upper part of the earth anchor and the said sleeve means of the coupler, and a pin insertable through said apertures for interlocking said components together.

4. In an anchor drive coupler for use in connecting a drive means with an earth anchor in preparation for and use in embedding the anchor into the ground, comprising, a length of sleeve means, said sleeve means having upper and lower closure plates, means provided upon the upper closure plate for attachment with the drive means, there being aligned apertures provided through the upper part of the earth anchor and the said sleeve means, and a pin insertable through said apertures for interlocking said components together.

5. The invention or claims 3 or 4 and including a tubular guide provided through the sleeve means and communicating with its aligned apertures, with said pin being insertable through such aperture and the tubular guide.

* * * * *